United States Patent Office 2,738,338
Patented Mar. 13, 1956

2,738,338

COPOLYMER OF STYRENE AND/OR BUTADIENE AND PARTIALLY HYDROGENATED FURFURAL-KETONE PRODUCT

Mortimer T. Harvey, South Orange, N. J., assignor to Harvel Research Corporation, a corporation of New Jersey No Drawing. Application April 2, 1952,
Serial No. 280,167

10 Claims. (Cl. 260—45.5)

This invention relates to novel compositions of matter and to methods for preparing them. In one of its more specific aspects, the invention is directed to combining styrene with partially hydrogenated organic reaction products or with such partially hydrogenated organic reaction products which were thickened or polymerized under acidic conditions. The organic reaction products before hydrogenation may be produced by reacting under alkaline conditions furfuraldehyde and a ketone having at least two hydrogen atoms on an alpha carbon such as acetone, diacetone alcohol, methyl ethyl ketone, acetonyl acetone, cyclohexanone, mesityl oxide, etc. I have discovered that novel and highly useful products have a utility in a number of different fields and may be produced by combining styrene, which may be in either monomeric or polymeric state and preferably in the liquid condition, with one or a combination of two or more of said unthickened or thickened partially hydrogenated furfuraldehyde-ketone organic reaction products, with a ratio of the former to the latter being variable over wide limits depending upon the ultimate product desired and may be in the ratio range of 5-95 to 95-5. Such combinations may be employed as casting resins, coating materials, insulating resins, etc. They may be combined with rubbery materials such as natural rubber, rubbery polymers of chloroprene, rubbery polymers of butadiene, rubbery copolymers of butadiene and styrene, and rubbery copolymers of butadiene and acrylonitrile, with the ratio by weight of the former to the latter being 5-100 parts of the former to 100 parts of the latter.

Prior to this invention, I produced novel products by partially hydrogenating furfuraldehyde-ketone organic reaction products and also other novel products by thickening or polymerizing said partially hydrogenated furfuraldehyde-ketone organic products under acidic conditions. The methods for producing them are disclosed in my copending applications Serial No. 144,594, filed February 16, 1950, and Serial No. 274,080, filed February 29, 1952, which are made part hereof. They disclose partially hydrogenated products in both the thickened and unthickened states and methods for preparing them.

The furfuraldehyde-ketone reaction products may be prepared by employing any of the methods known to the art. One method which may be employed in the preparation of the starting materials is to first produce the unhydrogenated reaction products. For this purpose, the furfuraldehyde and ketone are mixed with each other and then thereto is added a quantity of an alkaline material such as an aqueous solution of sodium hydroxide, potassium hydroxide, lime or the like. These three components are mixed with each other in an autoclave or closed unit and shortly after the mixture takes place an exothermic reaction occurs and the pressure within the autoclave will rise. This vigorous reaction is not easily controlled by ordinary methods, such as by using reacting units which have air vents through the top, because under such conditions many times there may be losses of some of the reaction products escaping through the air vents. For this reason, an autoclave is recommended as the reacting unit. After the exothermic reaction has subsided, the reaction is practically complete. In order to assure complete reaction and high yields, the mass in the autoclave is externally heated to maintain it in the state of boiling for a period of time depending upon the viscosity desired of the resultant reaction mass, which may vary from a thin liquid to a solid at room temperature. Generally, I prefer that the time of boiling is such that the viscosity of the reaction mass employed as a starting material when dehydrated is a liquid, that is, it is pourable at 25° C. and for some purposes at the present time no greater than approximately 20,000 cp. at 25° C., and in all cases no lower than 50 cp. at 25° C. This reaction provides compounds which are mono and di-furfuryl ketones, having the following formulae:

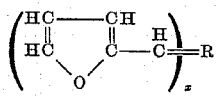

in which $x$ is a whole number selected from the group of 1 and 2, and R is a ketone lacking two of the hydrogen atoms normally on either one or both of its alpha carbons. These compounds are produced as a result of reaction between the furfuraldehyde and ketone wherein two hydrogen atoms on the alpha carbons unite with the oxygen of the furfuraldehyde to split off water. This reaction also provides an amorphous or resinous material. The quantity of said resinous material present in the reaction mass varies and is dependent upon the time magnitude of boiling of the reaction mass and is approximately 5% or more of the reaction mass by weight and in general measures about 5%–60% by weight of the reaction mass.

Reference is hereby made to the United States Patent 2,363,828 which issued to me and Solomon Caplan on November 28, 1944, and particularly to those examples therein disclosing organic reaction products produced by reacting under alkaline conditions furfuraldehyde and a ketone having two hydrogen atoms on an alpha carbon, and all of those compositions as well as fractions thereof may be employed as the unhydrogenated reaction products herein. The resultant reaction mass or any desired fraction thereof, some of which are particular compounds and others of which may be the residues or mixtures of two or more of them, may be employed as the unhydrogenated materials. The unhydrogenated reaction products thus include the organic reaction masses, the distillates as well as the residual fractions which may be obtained by the heat distillation of the masses, and I prefer that the heat distillation of the masses be carried out so that the weight of the residual fraction is at least 60% and preferably 60–95% by weight of the organic reaction mass. All of said unhydrogenated reaction products may be hydrogenated in order that at least approximately 15% and no more than 65% of the carbon to carbon double bonds thereof have been saturated with hydrogen.

In the following general example the resultant reaction products produced by the general method heretofore described will be treated merely to disclose a general method for hydrogenation, it being understood that any of the other aforesaid compositions may be used in place thereof.

General example

Said resultant reaction mass may then be rendered substantially neutral in any convenient manner. This may be easily accomplished by adding thereto the requisite amount of an aqueous solution of an acidic agent, such as hydrochloric acid, sulphuric acid, lactic acid or the like. Generally it is preferable that the amount of acidic agent be such as to lower the pH of the mass to a value in the range of 3–7.4 and generally in the range of 3–6.

Following this step, the mass is substantially completely dehydrated. One method for doing this is to heat preferably under a high vacuum, until all of the water and any unreacted components have been substantially completely distilled off.

This completely dehydrated reaction product may then be hydrogenated only partially by employing a nickel catalyst, maintaining the temperature thereof at a value of at least 120° C. and preferably in the range of 120–250° C. and the pressure thereof at a value of at least 25 lbs. per square inch and between 25–250 lbs. per square inch. The nickel employed may be in a finely divided state and may be coupled with any suitable carrier such as a hydrogenated vegetable oil, hydrogenated cardanol, etc.

Briefly, the hydrogenation may be accomplished by adding the requisite amount of nickel catalyst in the carrier to said dehydrated approximately neutral reaction product and the mixture is heated while vacuum is applied and agitated until a uniform mixture has been obtained. When the temperature of the mix reaches 120° C. the external source of heat is removed, hydrogen gas is admitted thereto to provide a pressure of 25–250 lbs. per square inch whereupon hydrogenation takes place and is an exothermic reaction. The addition of the hydrogen is continued whereupon the temperature of the mass rises and is maintained at a level no greater than 250° C. and the pressure is maintained at a value no greater than 250 lbs. per square inch and generally between 30–75 lbs. per square inch. The hydrogen is continuously added under the aforesaid conditions until the amount of added hydrogen is approximately 70–340 cubic feet measured at 20° C. and 760 mm. pressure. The hydrogen added and combined is approximately 15–65% of the quantity of hydrogen necessary for complete saturation of all the carbon to carbon double bonds thereof. The hydrogenation is discontinued after the desired degree of hydrogenation has been attained. Then the hydrogenated mass is allowed to cool to room temperature. By this procedure the reaction mass after hydrogenation is still unsaturated. The carbon to carbon double bonds of the compounds in said mass and outside of the furane ring have been at least 50% saturated with hydrogen, and may be 50–100% saturated with hydrogen with 0–50% saturation with hydrogen of the carbon to carbon double bonds in the furane ring.

When the mass to be hydrogenated is of a very high viscosity, for example, over 20,000 cp. at 25° C., I first dissolved the mass in a solvent, such as a high molecular weight ketone and then hydrogenated under the aforesaid conditions.

The partially hydrogenated reaction mass may be polymerized or thickened under acidic conditions to provide polymerized products of any desired viscosity. In this manner, slightly to highly polymerized products having unusual stability characteristics may be obtained. These polymerized or thickened products are characterized by when maintained at 300° F. for 24 hours they are in the substantially infusible state at the end of that period. In general, these polymers, either of low or high molecular weight, may be produced by adding to the hydrogenated mass or any fraction thereof an acidic catalyst such as sulphuric acid, phosphoric acid, hydrochloric acid, diethyl sulphate, zinc chloride, boron trifluoride, or the like to provide an acidic condition such that the pH of the mass is in the range of approximately 2–3.5. In factory practice the pH of the mass is approximately 3 or slightly below. Such acidified mass is heated to a temperature of 180° F. or above, and generally around 220–350° F. until the polymerization or thickening has reached the desired degree as evidenced by increasing viscosity which in all cases is at least 100% greater than the viscosity of the hydrogenated mass at 25° C. before said polymerization or thickening. In all cases, I prefer that the polymerization be discontinued before the mass, when at 100° C. is in the solid state and in all cases in the practice of this invention, the polymerized or thickened hydrogenated products as well as the unpolymerized or unthickened hydrogenated products are in the liquid condition at 100° C., that is, they will exhibit flow at 100° C.

The following Examples 1–7 are given merely to further illustrate the methods for providing some of the starting materials and are not to be construed in a limiting sense, all parts given being by weight unless otherwise indicated.

*Example 1*

Into a one-gallon pail is placed a quantity of sodium hydroxide weighing 2 lbs. 6 oz. Then there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical mixer or agitator which may be in the nature of a paddle mixer. This mixture is agitated and while in the state of agitation there is added thereto about ⅙ of the volume of said heretofore prepared aqueous solution of sodium hydroxide. With all the valves of the autoclave closed it will be noted that an exothermic reaction takes place in a very few minutes after the addition of the sodium hydroxide solution and the temperature of the mass continuously agitated by the stirrer will rise to approximately 150° F. in about three or four minutes. After about 10 minutes there is added to the mass in said autoclave another charge consisting of 40 lbs. of furfuraldehyde and 24 lbs. of acetone. Then to the mass in the autoclave there is added a second increment of said sodium hydroxide solution equal in volume to the first addition. After a few minutes the temperature of the mass will, due to the exothermic reaction, rise to approximately 165–170° F. The foregoing steps are repeated four more times so that the amount of furfuraldehyde and acetone added to the autoclave are equal to 240 lbs. and 144 lbs. respectively and all of the initially prepared aqueous solution of sodium hydroxide has been added. After the last addition of sodium hydroxide the temperature of the mass within the autoclave will have stabilized to about 180–195° F. Then the mass within the autoclave may be heated by means of a steam coil located therein and through a jacket carried thereby to maintain the temperature of the mass between approximately 185–190° F. for about 30 minutes in order to complete the reaction and to obtain high yields. The steam is cut off from the coil and jacket and then there is added thereto an aqueous solution of sulphuric acid in quantities sufficient to render the mass practically neutral. In this instance there may be added an aqueous solution of sulphuric acid consisting of 3 lbs. 3 oz. of concentrated sulphuric acid diluted in 6 lbs. 6 oz. of water. Then this mass may be heated for about 5 minutes at a temperature between 175–200° F. to substantially completely neutralize the mass. The substantially neutral mass may then be substantially completely dehydrated by heating the same to a temperature of 220° F. with or without vacuum, yielding approximately 300 lbs. of dehydrated substantially neutral material known as Product A, whose viscosity at 25° C. is 92 cp., and having a specific gravity at 25° C. of 1.150. When this material, Product A, is distilled at a pressure of approximately .1 mm. of mercury pressure a fraction (37% weighing approximately 110 lbs. comes off at temperatures in the range of 70–85° C. and is hereinafter known as Fraction I, apparently essentially mono-furfuryl-acetone leaving behind a residual fraction known as Product RFA, and a fraction (47%) measuring approximately 140 lbs. comes off in the temperature range of 150–165° C. and hereinafter is known as Fraction II. The residue measuring approximately 50 lbs. is a brittle solid on cooling. Analysis of Fraction I established a carbon content of 70.30% and hydrogen of 5.48% which corresponds to the carbon and hydrogen values of furfural acetone having the following formula:

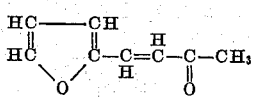

Analysis of Fraction II established a carbon content of 73.07% and a hydrogen content of 4.58% corresponding to the carbon and hydrogen values of difurfural acetone having the following formula:

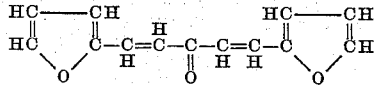

Example 1A 40 lbs. of Product A is placed in a 10-gallon closed unit equipped with a high speed propeller. Then one lb. of a catalyst and carrier combination containing 25% of catalytic nickel dispersed in a hydrogenated vegetable oil is added thereto and the mixture is continuously stirred in order to maintain a uniform distribution of the components. While in this state of agitation, the mass is externally heated to a temperature of 120° C. after substantially all the air in the container has been evacuated therefrom. Then hydrogen is admitted to provide a pressure of 40 lbs. per square inch. Hydrogen is continuously admitted to the mass and hydrogenation takes place exothermically and now the external source of heat is removed therefrom. By controlling the speed of addition of the hydrogen to the mass, the temperature is maintained at approximately 200° C. and the pressure of approximately 50 lbs. per square inch. The temperature during hydrogenation may also be controlled by external cooling. The hydrogen addition is terminated when no more hydrogen is taken up under these conditions with a period of about 30 minutes. The quantity of hydrogen taken up in this particular hydrogenation step apparently due to early poisoning of the catalyst amounted to approximately 145 cubic feet which corresponds roughly to the quantity of hydrogen required to saturate only the unsaturated carbon to carbon atoms outside of the furane ring.

This hydrogenated Product A, hereinafter known as HA is still a thin liquid and may be distilled if desired to provide separate various fractions thereof. By distilling this hydrogenated Product A at 0.3 mm. of mercury pressure a fraction distilled off up to 100° C. and was collected and amounted to 32%; a second fraction amounting to 41% distilled off and was collected at 120–170° C. That fraction which distilled off up to 100° C. is hereinafter known as Product HA-1 and consisted essentially of a compound having the following formula:

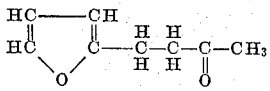

The second fraction which distilled off at 120–170° C. is hereinafter known as Product HA-2 and consisted essentially of a compound having the following formula:

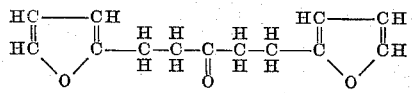

The residue known as HA-3 upon cooling was a brittle black solid.

Example 2

By using the same procedure as that set forth in Example 1, and substituting 180 lbs. of methyl ethyl ketone for the 144 lbs. of acetone, and terminating hydrogen addition when approximately 150 cu. ft. of hydrogen have been taken up, there may be produced a novel hydrogenated product. This hydrogenated product known as Product HB may be distilled to provide fractions HB-1 and HB-2 respectively, chiefly consisting of the following compounds:

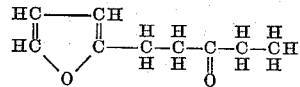

and

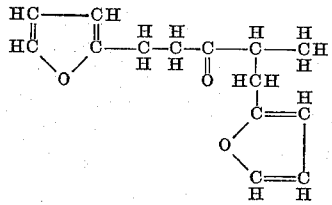

and a resinous residue HB-3 of more than 5% of the hydrogenated mass.

Example 3

By using the same procedure as that set forth in Example 2, and substituting 240 lbs. of diacetone alcohol for 180 lbs. methyl ethyl ketone, there may be produced a novel hydrogenated product known as HC. This hydrogenated product HC may be distilled to provide Fractions HC-1 and HC-2 respectively, consisting chiefly of the following compounds:

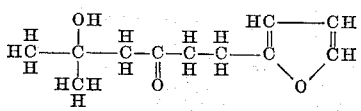

and

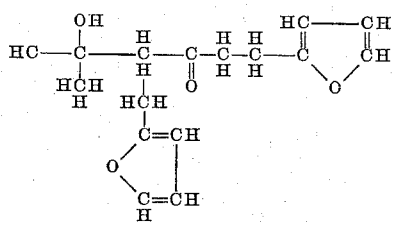

and a resinous residue HC-3 of more than 5% of the hydrogenated mass.

Example 4

Following the same procedure as that set forth in Example 1A and using fresh catalyst and terminating the hydrogenation after approximately 70, 100, 150, 175, 210 and 235 cu. ft. of hydrogen were taken up in six different 40 lb. batches of Product A, I obtained products HD, HE, HF, HG, HH and HI, differing from each other in the degree of hydrogen saturation.

Example 5

Following the same procedure as that set forth in Example 1A and employing fresh catalyst, 235 cu. ft. of hydrogen were taken up in a 40 lb. batch of Product A. Then the same amount of fresh catalyst, .25 lb. powdered nickel, was added thereto and hydrogenation continued until a total of 340 cu. ft. of hydrogen was taken up. This product is known as Product HJ.

Example 6

Following the same procedure as that of Example 1A and employing Fraction I of Example 1 in place of Product A, and terminating the hydrogenation after 1.3 and 1.8 moles proportionately of hydrogen were taken up by 1 mole proportion of said fraction, approximately 95 and 130 cu. ft. of hydrogen per 40 lbs. of Fraction I. The hydrogenation above the 1.3 mole proportion proceeded with difficulty. These two hydrogenated products are HK and HL and were respectively about 43% and 60% hydrogenated at the carbon to carbon double bonds.

Example 7

Following the same procedure as that of Example 1A and employing Fraction II of Example 1 in place of Product A, and 1 to 4 moles of hydrogen were taken up. Above 2 moles of hydrogen addition, additional increments of nickel catalyst were used. Various samples of 1, 2, 3 and 4 moles of hydrogen addition products are known as HM, HN, HO and HP respectively, and respectively were approximately 15, 30, 50 and 65% hydrogen saturated at the carbon to carbon double bonds.

All of these various partially hydrogenated products, examples of which have been hereinbefore set forth, may be polymerized or thickened in the manner heretofore generally described to provide polymers thereof and having a viscosity at 25° C. at least 100% greater than the partially hydrogenated products before said polymerization under acidic conditions.

The method which I have employed for ascertaining the pH of the various materials herein is that commonly used in the art for materials that are substantially free of water and substantially insoluble in water, and is as follows: About a 10–20 cc. sample of the material, and in this case the partially hydrogenated product together with the acidic agent, whose pH is to be ascertained is placed in a test tube containing about an equal volume of distilled water. The mixture is heated to about boiling while being shaken and then allowed to stand and come to room temperature. Then this aqueous mass is tested with a pH test paper commonly employed in the art.

According to this invention, said partially hydrogenated furfuraldehyde, ketone reaction products, illustrative examples of which are Products HA, HA–1, HA–2, HB, HB–1, HB–2, HC, HC–1, HC–2, and HD–HP, as well as any of them polymerized or thickened under acidic conditions, may be combined with styrene in either the monomeric or polymeric form in the proportions heretofore set forth. The term styrene as employed in this application is meant to include monomeric styrene as well as polymers of styrene unless otherwise specifically indicated.

In one of its more specific aspects, the invention is directed to combining (I) styrene with (II) a partially hydrogenated reaction product, liquid at 100° C. and selected from the group consisting of (a) partially hydrogenated monofurfuryl-ketone, (b) partially hydrogenated difurfuryl-ketone, (c) partially hydrogenated organic reaction masses, said reaction masses before hydrogenation having a viscosity of at least 50 centipoises at 25° C. and produced by reacting under alkaline conditions furfuraldehyde and a ketone having at least two hydrogen atoms on an alpha carbon, (d) partially hydrogenated residual fractions of said reaction masses before hydrogenation, said residual fractions before hydrogenation obtained by heat distillation of said reaction masses and measuring by weight at least 60% of said reaction masses, (e) fractions obtained by the heat distillation of (c), (f) thickened products produced by polymerizing or thickening (a)–(e) under acidic conditions, and (g) mixtures of two or more of (a)–(f). The monofurfuryl-ketone, difurfuryl-ketone, organic reaction masses and residual fractions thereof are hydrogenated to at least approximately 15% and no more than approximately 65% of the hydrogen necessary to completely saturate with hydrogen the carbon to carbon double bonds thereof to provide (a)–(d). The ratio by weight of (I) to (II) is 5–95 to 95–5. Such combinations will hereinafter be known as Products SP.

According to this invention, styrene and any one of (II) may be placed in a vessel and with or without the use of a catalyst provide novel combinations in the relative proportions as hereinbefore set forth. For copolymerization, catalyst and/or heat is generally required. The catalysts which are preferably employed are acidic agent, such as diethyl sulphate, paratoluene sulphonic acid, boron trifluoride, potassium persulfate, mono, butyl or propyl phosphate, etc., as well as peroxides such as benzoyl, hydrogen, tertiary butyl peroxide or the like. I prefer to employ acidic catalyst when I copolymerize styrene and any of (II) in the proportion of 100 parts by weight of the styrene to 5–100 parts by weight of (II); and to employ peroxide catalyst when I copolymerize styrene and any of (II) in the proportions of 100 parts by weight of (II) to 5–100 parts by weight of styrene. Thus copolymerization may be effected on either the acid or alkaline side.

These novel combinations of styrene and (II) are characterized as being faster setting and drying and in addition are less brittle than styrene in its solid state. The presence of (II) imparts a certain toughness to the styrene and reduces the extent of normal crazing thereof.

The following are a number of illustrative examples of various combinations of styrene and said partially hydrogenated products II, all parts given by weight unless otherwise specified.

Example 8

100 parts of Product HA, 100 parts monomeric styrene, 5 parts of a solution consisting of equal parts of paratoluene sulfonic acid in alcohol are heated together to approximately 110–120° C. whereupon a smooth reaction takes place. The copolymerization of the styrene and HA is thus continued until the mass is of desired viscosity which may vary depending upon what is desired. When the reaction mass is of required viscosity, a quantity of lime is added thereto to stop the continued reaction on the acid side and this mass which is in the liquid state is known as Product SP–1. Then the thick mass may be thinned with a solvent, such as alcohols, ketones, etc., and such solutions may be applied on to a base to coat and/or impregnate it, the solvent is driven off and then, if desired, heat cured at 150° C. If desired, the mass, preferably with the thinner, is mixed with asbestos, cotton linters or the like and formed and cured at elevated temperatures to provide a wide variety of products useful in the different arts.

Example 9

50 grams of monomeric styrene was mixed with 150 grams of a thickened or polymerized product produced by thickening Product HA with diethyl sulphate until its viscosity was 10–20 times that of Product HA. Then into said mixture was added 5 grams of boron trifluoride in ether, and the mixture agitated whereupon at room temperature exothermic reaction coupling or copolymerizing the materials takes place. After about 1 hour, the mass is neutralized by the addition of lime to stabilize the reaction product known as Product SP–2. The resultant mass is a thick mass which although stable at room temperature has the property of curing to the solid state in a few minutes at 150° C. Another remarkable property of the mass is the small amount of gassing, if any, which takes place at that curing temperature.

Example 10

There were mixed together 50 parts of monomeric styrene and 125 parts of a homogeneous mass consisting of Product HA, an oil soluble black known as "Calco Liquid Oil Black 9096" of Calco Division of American Cyanamide Co., and alcohol in the proportions of 5 lbs., 160 grams and 1 pound. Then throughout said mix was uniformly distributed 30 parts of a solution consisting of equal parts of paratoluene sulfonic acid and alcohol. This mass has a pot life of several days at room temperature, but when sprayed as a thin film on wood dries remarkably fast.

Example 11

20 parts monomeric styrene, 2 parts of HA and 1 part of benzoyl peroxide were mixed together and then the mix maintained at 150° C. to effect copolymerization which proceeded very nicely to a heavy viscous yet liquid state. This product known as SP-4 may be thinned with a solvent such as toluol or even monomeric styrene and then coated on paper, glass or cloth and dried to a point where it has not completely kicked over but may be rolled up without sticking. Such dry but thermoplastic coated bases may be employed as wrappings on coils, transformer coils, etc., and subsequently cured to obtain products less effected by heat and having high dielectric strength, low power factor loss, etc.

*Example 12*

5-50 parts of HA or acid polymerized HA and 100 parts of monomeric styrene were mixed together and may be spread on a base to be coated and converted to the solid state by maintaining at 150° C.

*Example 13*

100 grams of solid polystyrene and 10 grams of HA were maintained at 150° C. for 72 hours. At the end of that period, the mass was in the solid state and being much less brittle than a blank of only said polystyrene under the same conditions.

*Example 14*

Employing the same procedure and materials as Example 8, but substitute HA-1, HA-2, RFA, HB, HB-1, HB-2, HC, HC-1, HC-2 or HDHP, or any of them polymerized under acidic conditions and having a viscosity 2-20 times that of the product before said polymerization may be substituted for the HA of Example 8. A number of highly useful products are obtained. Still other products may be obtained by substituting liquid polymerized styrene or solid polymerized styrene for the monomeric styrene of this example.

The combinations of (I) and (II) and preferably those which are in the liquid or pourable state at 100° C. may be combined with one or more of said rubbery materials heretofore set forth and in said proportions. This may be done by employing a rubber mill or a dough mixer, and such compositions when cured have greatly improved ozone resistance.

In addition, styrene and one or more of (II) and butadiene all may be copolymerized together. One method for accomplishing this purpose is illustrated by the following example which is given by way of illustration and not limitation.

*Example 15*

Make up an aqueous solution of sodium oleate containing 10% sodium oleate. Then to 750 parts of said aqueous solution in a closed vessel add individually or together 100 parts of liquid butadiene, 25 parts of monomeric styrene and 25 parts of HA and 2 parts of benzoyl peroxide. Stir rapidly and hold to temperature of 35-100° C. for copolymerization. Then after the desired degree of copolymerization is obtained, it may be used as an emulsion or throw out by breaking emulsion with small amount of acetic acid.

If desired, the styrene may be omitted to obtain copolymerization of the butadiene and the particular product (II) employed.

*Example 16*

100 parts of any one of said rubbery materials are milled on a rubber mill and during milling there is added thereto 5-100 parts of Product SP, a combination of styrene and (II) in any desired proportion and preferably in the copolymerized and liquid condition, which may be gelatinous but exhibiting cold flow, examples of which are herein set forth. The milling is continued until uniform distribution has been obtained of said components and also of other components such as fillers, etc., which may be added. The resultant mass may be extruded directly on to electrical conductors or molded and subsequently cured and will be found to have good electrical resistance and also enhanced ozone resistance.

The ratios of the butadiene, styrene and HA as set forth in Example 15 may be varied and also for HA any of the other products (II) may be employed in place of HA. In general, the ratio by weight of butadiene to the styrene may be in the range of 100 to 10-50 and the ratio by weight of the butadiene to (II) may be in the range of 100 to 5-40. And the same ratio range of butadiene to (II) may be employed when the styrene is omitted and the same general procedure as Example 15 followed.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

I claim:

1. A copolymer of (I) styrene and (II) a product liquid at 100° C. and selected from the group consisting of (a) partially hydrogenated monofurfuryl-ketone, (b) partially hydrogenated difurfuryl-ketone, (c) partially hydrogenated organic reaction masses, said (c) being (x) organic reaction masses produced by reacting under alkaline conditions furfural and a ketone having at least 2 hydrogen atoms on an alpha carbon, said organic reaction masses (x) before hydrogenation having a viscosity of at least 50 centipoises at 25° C. and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)-(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof, the ratio by weight of (I) to (II) being 5-95 to 95-5.

2. A copolymer of (I) styrene and (II) a partially hydrogenated organic reaction mass liquid at 100° C., said (II) being an organic reaction mass produced by reacting under alkaline conditions, furfural and a ketone having at least 2 hydrogen atoms on an alpha carbon and then hydrogenating said organic reaction mass by combining hydrogen therewith to an extent at least approximately 15% and no more than approximately 65% of that necessary to completely saturate with hydrogen the carbon to carbon double bonds thereof, the ratio by weight of (I) to (II) being 5-95 to 95-5.

3. A copolymer of (I) styrene and (II) a partially hydrogenated organic reaction mass which was thickened under acidic conditions and is in the liquid state, said organic reaction mass before thickening, produced by reacting under alkaline conditions, furfural and a ketone having at least 2 hydrogen atoms on an alpha carbon, and then hydrogenating by combining hydrogen therewith to an extent at least approximately 15% and no more than approximately 65% of that necessary to completely saturate with hydrogen the carbon to carbon double bonds thereof, the ratio by weight of (I) to (II) being 5–95 to 95–5.

4. A copolymer of (I) styrene and (II) partially hydrogenated difurfuryl-ketone being difurfuryl-ketone hydrogenated to an extent at least approximately 15% and no more than approximately 65% of that necessary to completely saturate with hydrogen the carbon to carbon double bonds thereof, the ratio by weight of (I) to (II) being 5–95 to 95–5.

5. A copolymer of (I) styrene and (II) partially hydrogenated difurfuryl-ketone which was thickened under acidic conditions and is in the liquid state, said partially hydrogenated difurfuryl-ketone produced by hydrogenating difurfuryl-ketone to an extent at least approximately 15% and no more than approximately 65% of that necessary to completely saturate with hydrogen the carbon to carbon double bonds thereof, the ratio by weight of (I) to (II) being 5–95 to 95–5.

6. A composition of matter comprising an intimate combination of (III) a rubbery material selected from the group consisting of natural rubber, rubbery polymers of butadiene, rubbery copolymers of butadiene and styrene, and rubbery copolymers of butadiene and acrylonitrile, with (IV) a composition defined in claim 1, the ratio by weight of (IV) to (III) being 5–100 parts of (IV) to 100 parts of (III).

7. A composition of matter comprising (V) butadiene, (I) normally liquid styrene and (II) a normally liquid product selected from the group consisting of (a) partially hydrogenated monofurfuryl-ketone, (b) partially hydrogenated difurfuryl-ketone, (c) partially hydrogenated organic reaction masses, said (c) being (x) organic reaction masses produced by reacting under alkaline conditions furfural and a ketone having at least 2 hydrogen atoms on an alpha carbon, said organic reaction masses (x) before hydrogenation having a viscosity of at least 50 centipoises at 25° C. and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof, the ratio by weight of (V) to (II) being 100 to 5–40 and the ratio by weight of (V) to (I) being 100 to 10–50, said (V), (I) and (II) being copolymerized with each other.

8. A composition of matter comprising copolymerized (V) butadiene and (II) a normally liquid product selected from the group consisting of (a) partially hydrogenated monofurfuryl-ketone, (b) partially hydrogenated difurfuryl-ketone, (c) partially hydrogenated organic reaction masses, said (c) being (x) organic reaction masses produced by reacting under alkaline conditions furfural and a ketone having at least 2 hydrogen atoms on an alpha carbon, said organic reaction masses (x) before hydrogenation having a viscosity of at least 50 centipoises at 25° C. and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof, the ratio by weight of (V) to (II) being 100 to 5–40.

9. The method comprising copolymerizing, in the presence of an acidic catalyst, (I) normally liquid styrene and (II) a normally liquid product selected from the group consisting of (a) partially hydrogenated monofurfuryl-ketone, (b) partially hydrogenated difurfuryl-ketone, (c) partially hydrogenated organic reaction masses, said (c) being (x) organic reaction masses produced by reacting under alkaline conditions furfural and a ketone having at least 2 hydrogen atoms on an alpha carbon, said organic reaction masses (x) before hydrogenation having a viscosity of at least 50 centipoises at 25° C. and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof, the ratio by weight of (I) to (II) being 100 parts of (I) to 5–100 parts of (II).

10. The method comprising copolymerizing, in the presence of a peroxide catalyst, (I) normally liquid styrene and (II) a normally liquid product selected from the group consisting of (a) partially hydrogenated monofurfuryl-ketone, (b) partially hydrogenated difurfuryl-ketone, (c) partially hydrogenated organic reaction masses, said (c) being (x) organic reaction masses produced by reacting under alkaline conditions furfural and a ketone having at least 2 hydrogen atoms on an alpha carbon, said organic reaction masses (x) before hydrogenation having a viscosity of at least 50 centipoises at 25° C. and then hydrogenating (x) by combining hydrogen therewith to an extent at least approximately 15% and no more than approximately 65% of that necessary to completely saturate with hydrogen the carbon to carbon double bonds thereof, (d) partially hydrogenated residual fractions of (x), said (d) being residual fractions of (x) obtained by the heat distillation of (x) and measuring at least 60% of the weight of (x) and then hydrogenating said residual fractions of (x) by combining hydrogen therewith to an extent at least approximately 15% and no more than approximately 65% of that necessary to completely saturate with hydrogen the carbon to carbon double bonds thereof, (e) residual fractions of (c) obtained by the heat distillation of (c) and measuring at least 60% by weight of (c), (f) polymerized products produced by polymerizing (a)–(e) respectively under acidic conditions, said (a) and (b) respectively produced by hydrogenating monofurfuryl-ketone and difurfuryl ketone by combining hydrogen therewith to an extent at least approximately 15% and no more than approximately 65% of that necessary to completely saturate with hydrogen the carbon to carbon double bonds thereof, the ratio by weight of (II) to (I) being 100 parts of (II) to 5–100 parts of (I).

References Cited in the file of this patent

UNITED STATES PATENTS

| | | |
|---|---|---|
| 2,292,734 | Bent et al. | Aug. 11, 1942 |
| 2,327,007 | Bent et al. | Aug. 17, 1943 |
| 2,600,403 | Harvey | June 17, 1952 |
| 2,600,764 | Harvey | June 17, 1952 |